United States Patent [19]
Moss et al.

[11] Patent Number: 5,917,899
[45] Date of Patent: Jun. 29, 1999

[54] METHOD OF CONNECTING A PLURALITY OF VIRTUAL NETWORKS

[75] Inventors: John Wesley Moss, Lake Zurich; Pitsa Madoch, Glenview, both of Ill.

[73] Assignee: Ameritech Corporation, Del.

[21] Appl. No.: 08/768,382

[22] Filed: Dec. 17, 1996

[51] Int. Cl.⁶ ................................................ H04M 7/00
[52] U.S. Cl. .......................... 379/220; 379/207; 379/230
[58] Field of Search ................................... 379/201, 207, 379/219, 220, 221, 229, 230

[56] References Cited

U.S. PATENT DOCUMENTS

| | | | |
|---|---|---|---|
| 4,797,913 | 1/1989 | Kaplan et al. | 379/91.02 |
| 4,972,464 | 11/1990 | Webb et al. | 379/112 |
| 5,023,904 | 6/1991 | Kaplan et al. | 379/91.02 |
| 5,247,571 | 9/1993 | Kay et al. | 379/212 |
| 5,386,467 | 1/1995 | Ahmad | 379/220 |
| 5,455,855 | 10/1995 | Hokari | 379/229 |
| 5,475,749 | 12/1995 | Akinpelu et al. | 379/221 |
| 5,483,582 | 1/1996 | Pugh et al. | 379/144 |
| 5,515,427 | 5/1996 | Carlsen et al. | 379/220 |
| 5,517,562 | 5/1996 | McConnell | 379/207 |
| 5,539,817 | 7/1996 | Wilkes | 379/230 |
| 5,550,912 | 8/1996 | Akinpelu et al. | 379/221 |
| 5,583,926 | 12/1996 | Venier et al. | 379/229 |
| 5,586,177 | 12/1996 | Farris et al. | 379/229 |
| 5,598,464 | 1/1997 | Hess et al. | 379/229 |
| 5,602,909 | 2/1997 | Carkner et al. | 379/220 |
| 5,610,977 | 3/1997 | Williams et al. | 379/220 |
| 5,631,946 | 5/1997 | Campana, Jr. et al. | 379/100.08 |
| 5,661,782 | 8/1997 | Bartholomew et al. | 379/230 |
| 5,661,792 | 8/1997 | Akinpelu et al. | 379/221 |
| 5,708,702 | 1/1998 | De Paul et al. | 379/229 |
| 5,740,239 | 4/1998 | Bhagat et al. | 379/207 |
| 5,748,724 | 5/1998 | Sonnenberg | 379/207 |
| 5,764,745 | 6/1998 | Chan et al. | 379/229 |

*Primary Examiner*—Scott Wolinsky
*Attorney, Agent, or Firm*—Bruce E. Stuckman; Dale B. Halling

[57] ABSTRACT

A method using an advanced intelligent network to seamlessly connect a plurality of virtual networks includes the steps of: (a) Receiving a number of dialed digits at a first service switching point in a first local access and transport area (10); (b) When the first service switching point is determined to be a hub service switching point (22), sending a query to a service control point (24); (d) Determining if the dialed digits require an access to a private networks interLATA call; and (e) When the dialed digits require access to the private networks interLATA call, routing the call over a tie line (40) to a second hub service switching point (34) in a second local access and transport area (26).

24 Claims, 5 Drawing Sheets

METHOD OF CONNECTING A PLURALITY OF VIRTUAL NETWORKS

FIELD OF THE INVENTION

The present invention relates generally to the field of communications and more particularly to a method of connecting a plurality of virtual networks.

BACKGROUND OF THE INVENTION

Telecommunication customers can have virtual private networks within a local access and transport area (LATA), that allow the customer to have abbreviated calling between numerous locations. The virtual private network provides the customer the same functionality that a customer can receive using a plurality of centrex or private branch exchanges (PBXs) tied together by dedicated lines. However, the virtual private network does not require the capital costs and maintenance headaches that PBX virtual networks require. The virtual private network for a local exchange carrier (LEC) is limited to a single LATA and many customers want a virtual private network that can encompass all their offices in multiple LATAs.

Some solutions to connecting the virtual networks in separate LATAs have been proposed, but none of these solutions provide a seamless connection between the virtual networks. For instance, many of these solutions require a separate local dialing plan and virtual private network (VPN) dialing plan. In addition, some of these solutions require capital costs and maintenance headaches. Thus there exists a need for a method of connecting virtual networks that overcomes these and other problems.

DETAILED DESCRIPTION OF THE DRAWINGS

The invention uses the advanced intelligent network to connect a plurality of virtual networks together seamlessly. The process involves the steps of: (a) Receiving a number of digits at a first service switching point in a first local access and transport area; (b) Sending a query to a switching control point; (c) When the digits result in a call that is an interLATA call, sending a response to the first service switching point that contains a routing instruction to a first hub service switching point; (d) Routing the call to the first hub service switching point; (e) Transmitting an initial address message to the first hub service switching point; (f) Sending a second query to the switching control point from the first hub service switching point; (g) Receiving a second response from the switching control point and (h) Routing the call over a tie line to a second hub service switching point in a second local access and transport area.

Figure 1:
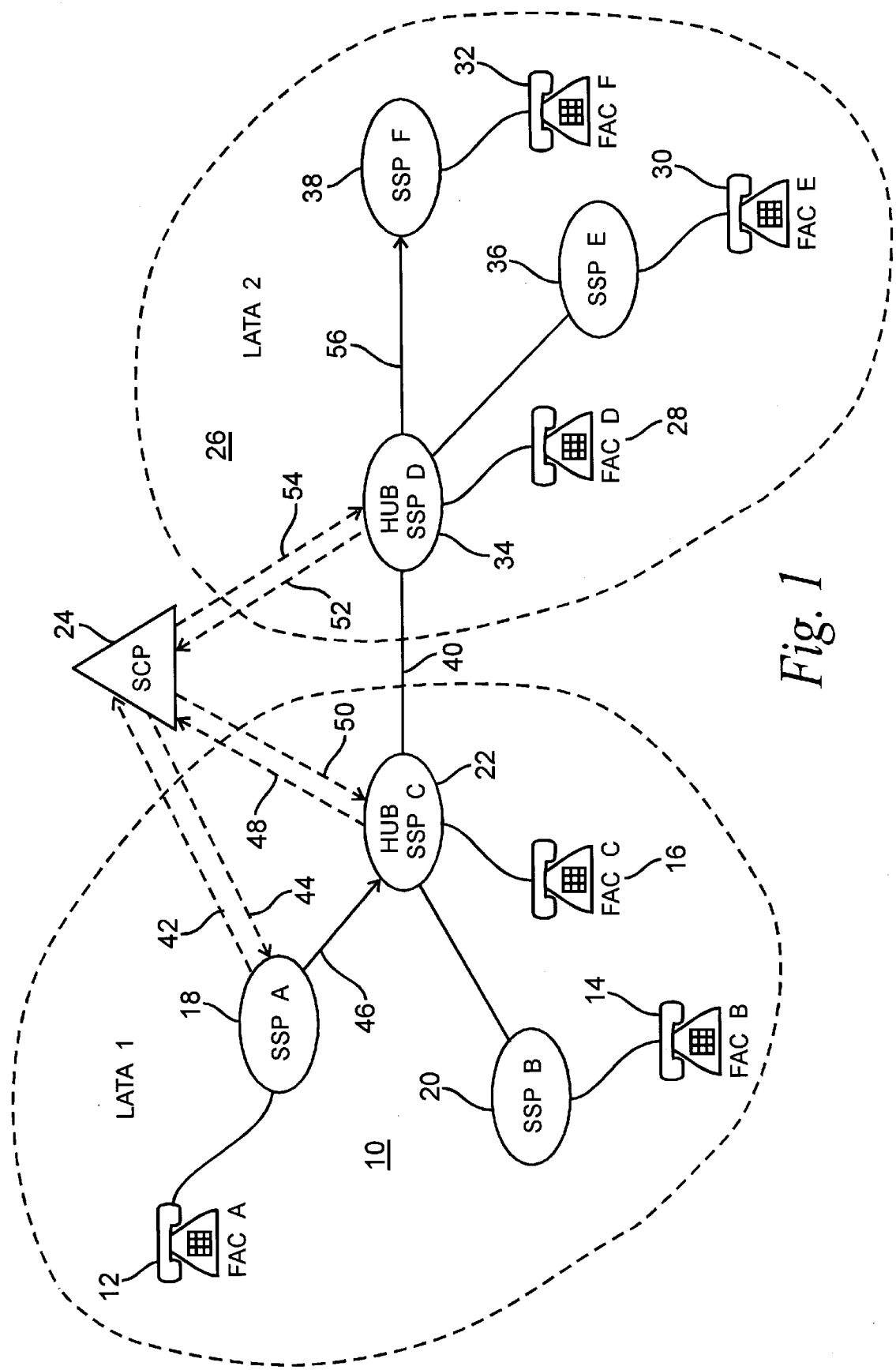
FIG. 1 is a schematic diagram of an advanced intelligent network capable of implementing the invention.

FIG. 1 is a schematic diagram of an advanced intelligent network capable of implementing the invention. The first virtual network 10 consists of a customer facility A 12, a customer facility B 14 and a customer facility C 16, in a first local access and transport area (LATA). The facilities 12, 14, 16 are connected to service switching point A (SSP A) 18, SSP B 20 and SSP C. The SSPs 18, 20, 22 are all connected by the public switched telephone network. Each of the SSPs 18, 20, 22 are connected to a switching control point (SCP) 24 by a signal system seven (SS7) signaling links. The first virtual network connects the customer's facilities A-C 12, 14, 16 in the first LATA and provides abbreviated dialing, intercom calling and other features among the facilities 12, 14, 16.

The second virtual network 26 in LATA 2 (second local access and transport area) connects facility D 28, facility E 30 and facility F 32 together. The facilities D-F are connected through SSP D 34, SSP E 36 and SSP F 38. As in the first virtual network 10, the SSPs 34, 36, 38 are connected by the public switched telephone network. Each of the SSPs 34, 36, 38 are also connected to the SCP 24 by the SS7 signaling links. A tie line (DS-1) connects a first hub SSP 22 in the first virtual network 10 to a second hub SSP 34 in the second virtual network 26. The figure could be expanded to show a plurality of virtual networks, wherein a plurality of tie lines are used to connect a plurality of hub service switching points in the plurality of virtual networks. The operation of this expanded diagram would be unchanged from the simpler version shown in FIG. 1.

In a first example of the invention, a customer at facility A 12 places a call to a customer at facility F 32. In this example the customer dials an abbreviated dial code (e.g., 6000) (plurality of digits, plurality of dialed digits, network access request). SSP A 18 triggers on the abbreviated dial code and sends a query (first query) 42 over the SS7 signal link to the SCP 24. The SCP 24 determines that the abbreviated, dial code is an interLATA call and transmits a response (first response) 44 containing a called party ID parameter that is the routing number of the first hub SSP 22. In addition, the SCP 24 converts the abbreviated dial code to a translated routing number (e.g., 217-936-1234) and sends this to the SSP A 18.

The SSP A 18 routes the call (network connection) 46 to the first hub SSP 22 based on the response 44. In addition, the SSP A 18 sends an initial address message (IAM) over the SS7 signaling links to the hub SSP 22. The IAM includes the translated routing number and the called number (routing number of the hub SSP 22).

The hub SSP 22 triggers on the called number and sends a second query 48 to the SCP 24. The SCP 24 converts the original called number back into the abbreviated dial code and determines the primary trunk group that specifies the tie line 40. The SCP 24 also determines the billing information at this point. The SCP 24 then sends a response 50 with the primary trunk group, billing information and the abbreviated dial code to the hub SSP 22. The first hub SSP 22 then routes the call over the tie line 40 to the second hub SSP 34. The first hub SSP 22 also sends the abbreviated dial code to the second hub SSP 34.

The second hub SSP 34 triggers on the abbreviated dial code and sends a third query 52 to the SCP 24. The SCP 24 convert the abbreviated dial code to the translated routing number and sends a third response (third routing instruction) 54 to the second hub SSP 34 with this information. The second hub SSP 34 then routes 56 the call to a second service switching point 38. The second SSP 38 then routes the call to the call party at facility F 32. In another example, the customer at facility A 12 places a call to a telephone at facility F 32, by dialing an access code and ten digit number (e.g., 9-1-217-936-1234). In this case the SSP 18 triggers on the access code (i.e., 9) and sends a query 42 to the SCP 24. The SCP 24 determines the dialed digits are a direct dial interLATA call and sends a response 44 including a hub SSP 22 routing number. The SSP 18 routes 46 the call to the hub SSP 22 based on the routing number. The hub SSP 22 again triggers on the called number and sends a second query 48 to the SCP 24 The SCP 24 determines that the plurality of dialed digits have an access to virtual networks abbreviated dial code (i.e., 6000). In addition, the SCP 24 determines that the call is to be routed by tie line 40. The SCP 24 sends a second response (second routing instruction) 50 including the primary trunk group and the abbreviated dial code. The rest of the processing of the call is the same as the first example from here.

In a third example a customer at facility C 16 places a call to facility F 32. The customer dials the abbreviated dial code. The hub SSP 22 uses the same processing as above to determine if the call is an access to private networks call to determine that the call is to be routed over tie line 40. The hub SSP 22 routes the call over the tie line 40 and sends the abbreviated dial code over the tie line 40 to the second hub SSP 34. The call is then processed in the same way as the previous examples.

In a fourth example a call is placed to facility D 28. In this example, the second hub SSP 34 receives the call and the abbreviated dial code like the examples discussed above. The SSP 34 then performs a centrex translation to determine the routing number of the called party and routes the call to the called party (terminating point) at facility D 28.

Figure 2:
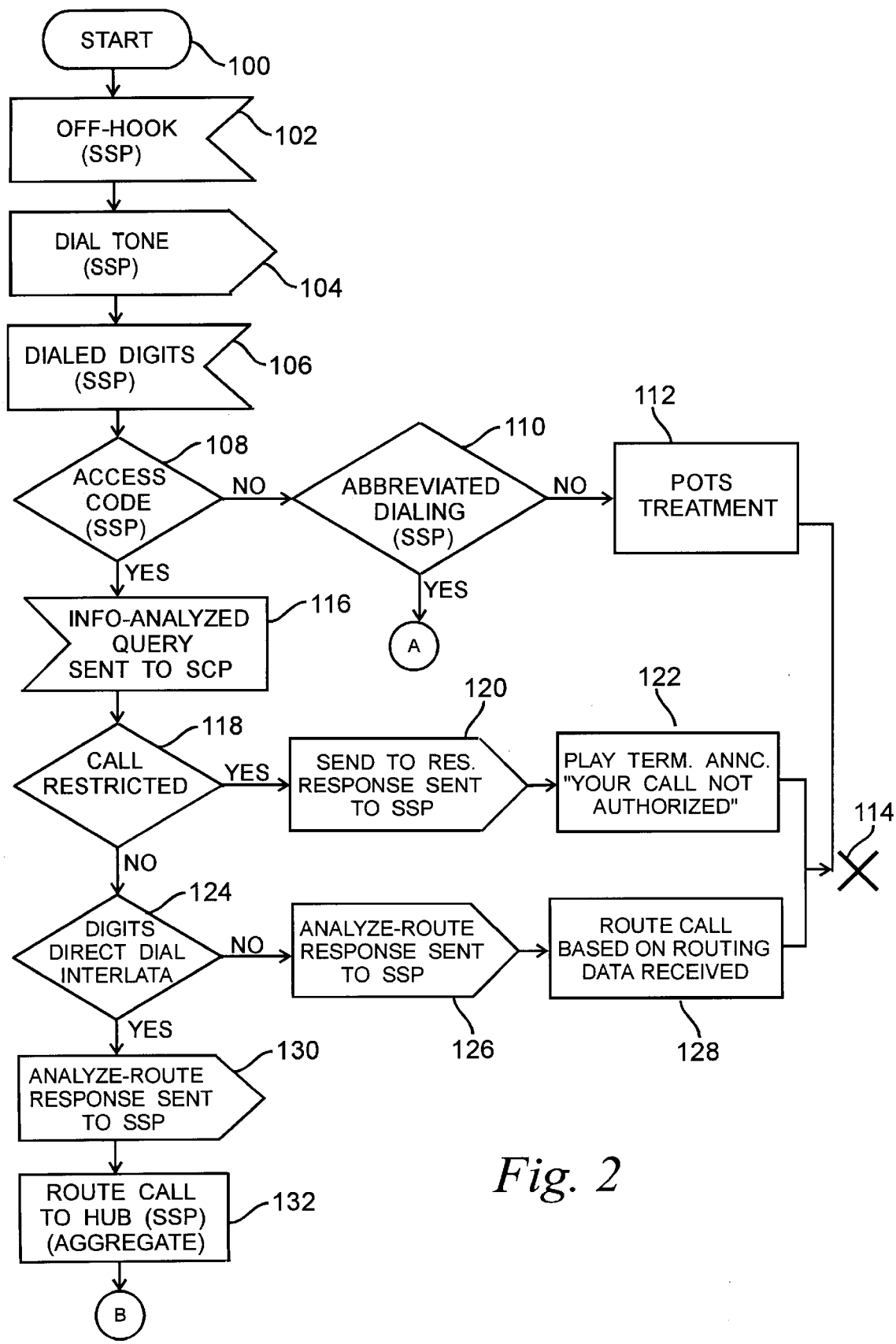
FIG. 2 is a flow chart of an embodiment of the steps performed by a service switching point and a switching control point according to the invention.

FIG. 2 is a flow chart of an embodiment of the steps performed by a service switching point and a switching control point according to the invention. The process starts, step 100, with the first SSP receiving an off-hook signal at step 102. The first SSP then sends a dial tone to the originating telephone at step 104. The first SSP receives a plurality of dialed digits at step 106. At step 108 it is determined if the plurality dialed digits include an access code. When the plurality dialed digits do not include the dial plan escape access code, the SSP determines if the plurality dialed digits is an abbreviated dial code at step 110. When the plurality dialed digits is not the Area Wide Networking (AWN) abbreviated dial code, the call is processed by standard POTS (plain old telephone service) or centrex translation at step 112. This will only occur using this service if an error has occurred. The call processing then terminates at step 114.

Figure 3:
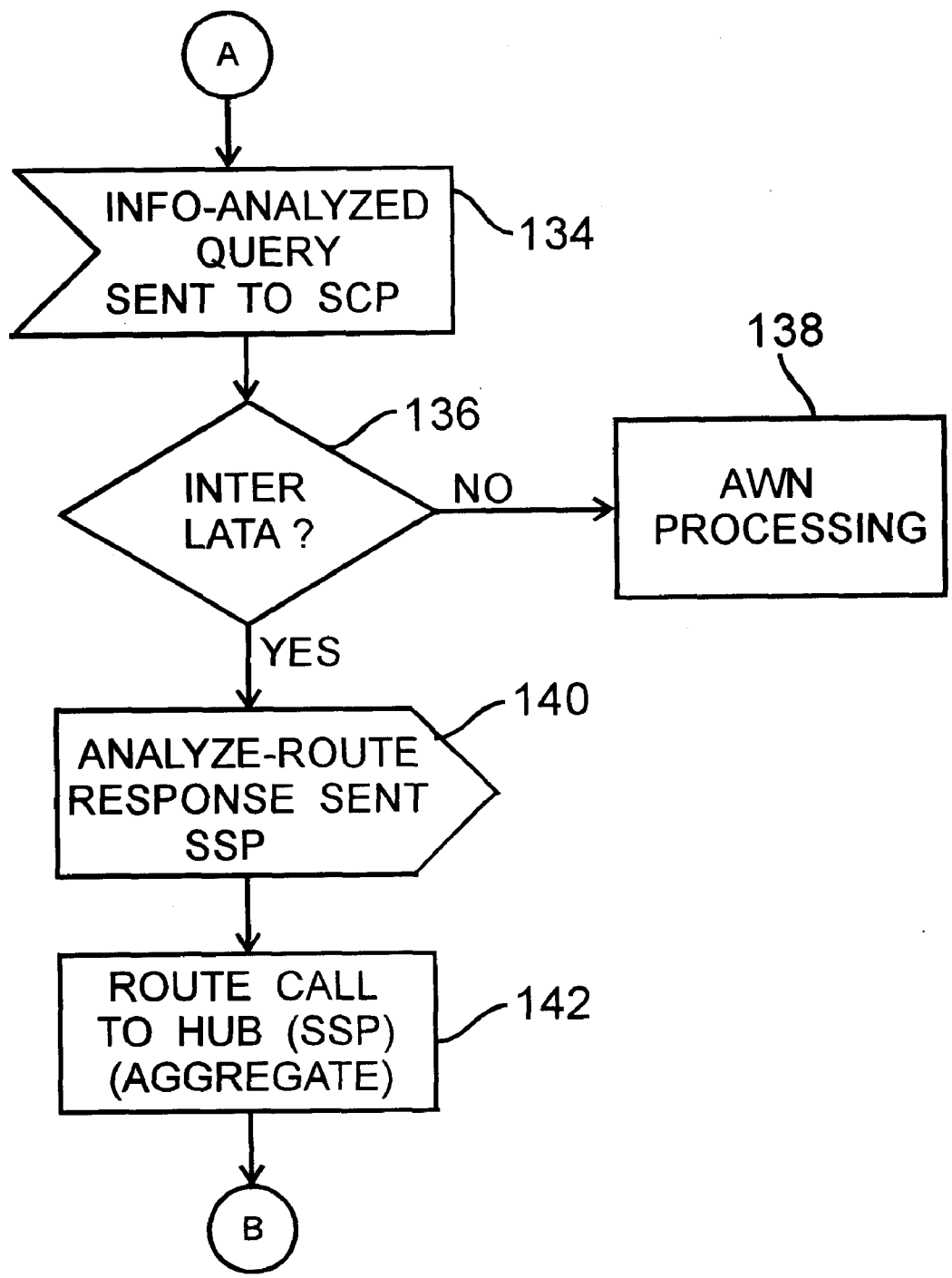
FIG. 3 is a part of the flow chart of FIG. 2.

When the plurality dialed digits is the abbreviated dial code at step 110, processing continues at A on FIG. 3. The first SSP sends an information analyzed query at step 134, containing the abbreviated dial code. The SCP then determines if the call is an in-network interLATA call at step 136. When the call is not the interLATA call, standard AWN processing occurs at step 138. This is not the standard processing route for this service. When the call is the in-network interLATA call, sending an analyze route response to the first SSP containing the routing number of the hub SSP and a translated routing number at step 140. The call is then routed by the first SSP to the first hub SSP at step 142.

When the plurality dialed digits includes the access code at step 108, sending an information analyzed query including the plurality of dialed digits less the access code to the SCP at step 116. The SCP then determines if the call is restricted at step 118. When the call is restricted, a restricted call response message is sent to the SSP at step 120. The SSP then plays the terminating announcement that the call is not authorized at step 122, which ends the processing at step 114.

When the call is not restricted at step 118, the SCP determines if the dialed digits (plurality of dialed digits) require a direct dialed interLATA call at step 124. When the call is not the direct dialed interLATA call, a normal route response is sent to the SSP at step 126. The SSP then routes the call based on the normal route response at step 128, which ends processing at step 114.

When the call is the direct dialed interLATA call, an analyze route response is transmitted to the SSP at step 130. The SSP then routes the call to the hub SSP for aggregation at step 132 and sends an initial address message to the hub SSP.

Figure 4:
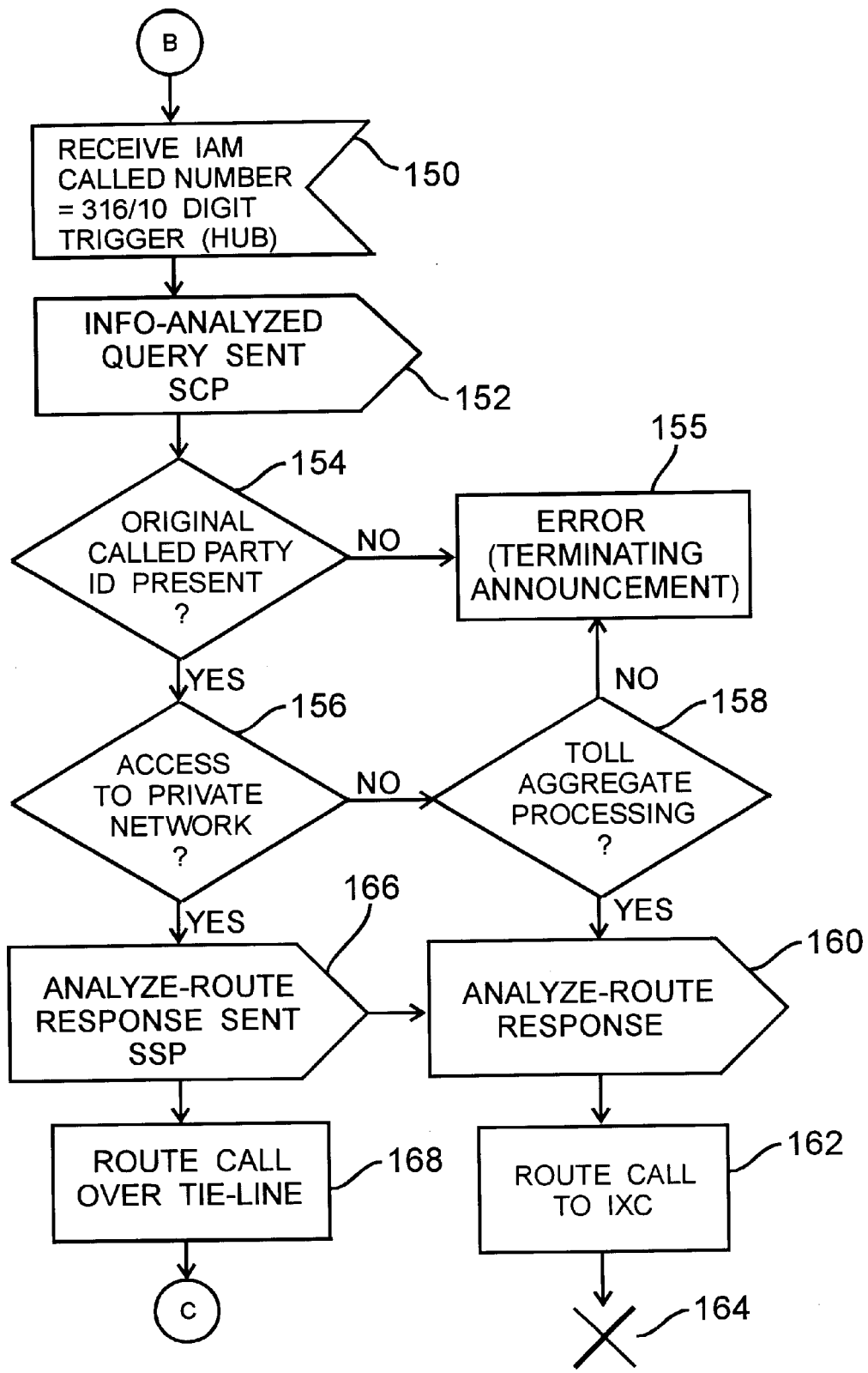
FIG. 4 is a flow chart of an embodiment of the steps performed by a hub service switching point and the switching control point according to the invention.

Processing then continues with the first hub SSP at B on FIG. 4.

Call processing then starts at B of FIG. 4. FIG. 4 is a flow chart of an embodiment of the steps performed by a hub service switching point and the switching control point according to the invention. The hub SSP receives an initial address message sent by the first SSP (first service switching point) at step 150. The hub SSP triggers on the called number and sends an information analyzed query to the SCP at step 152. The SCP determines if the original called party ID is present at step 154. When the original called party ID is not present at step 154, an error has occurred and a terminating announcement is played at step 155.

When the original called party ID is present, it is determined if call is an access to virtual networks call at step 156. When the call is not an access to virtual networks call, then it is determined if the call is a toll aggregation call at step 158. When the call is not the toll aggregation call, an error has occurred and a terminating announcement is played at step 156. When the call is the toll aggregation call, an analyze response message is sent to the hub SSP at step 160. The hub SSP routes the call to a preferred inter-exchange carrier at step 162, which ends call processing at step 164. The toll aggregation processing 158, 160, 162 is not the standard call processing for this service.

When the call is the access to virtual networks call at step 156, an analyze route message is sent to the hub SSP at step 166. The analyze route message contains the abbreviated dial code of the called party and the primary trunk group of the tie line. The hub SSP routes the call over the tie line at step 168. Call processing then continues at C on FIG. 5.

Figure 5:
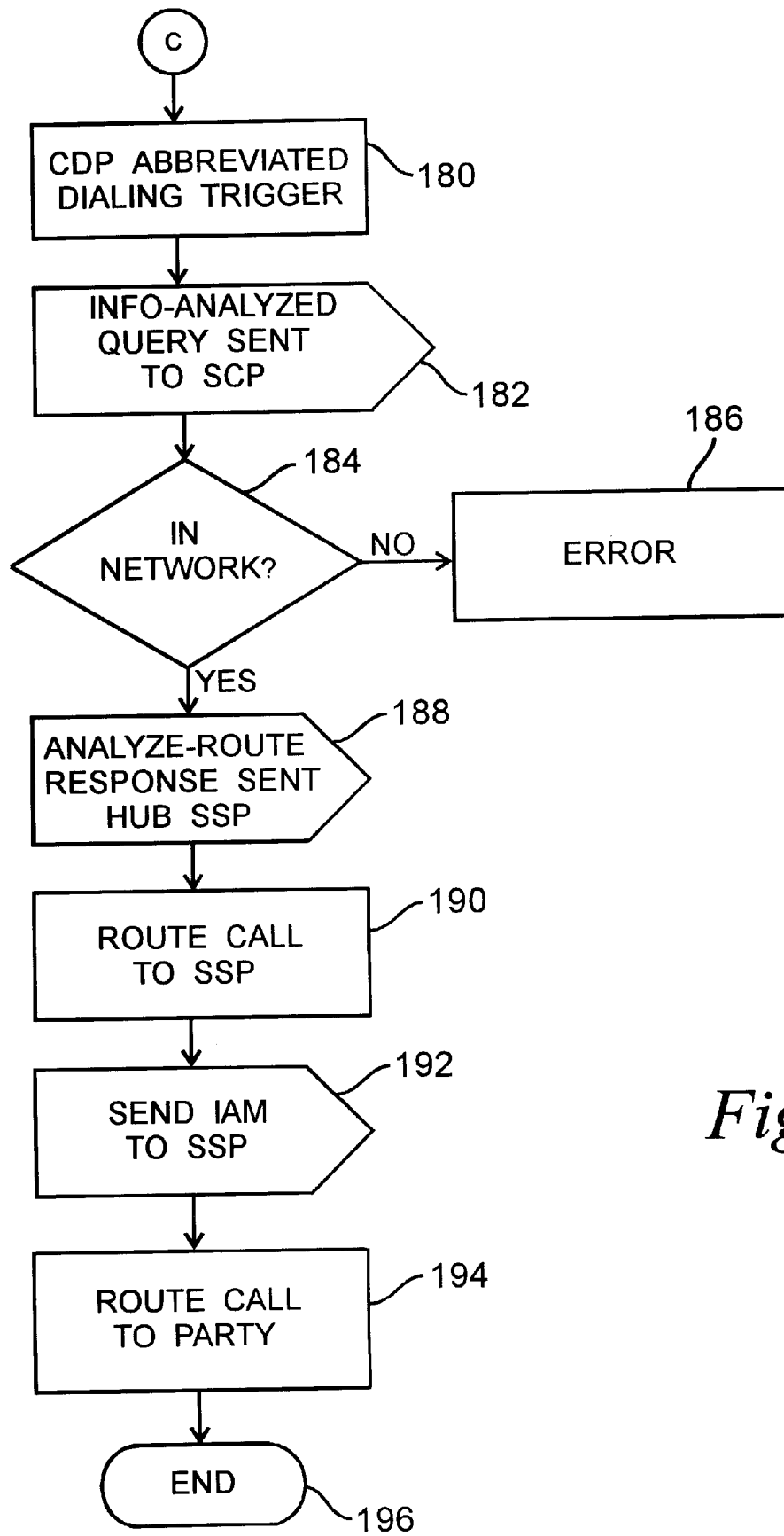
FIG. 5 is a flow chart of an embodiment of the steps performed by a second hub service switching point, the switching control point and a second service switching point according to the invention.

FIG. 5 is a flow chart of an embodiment of the steps performed by a second hub service switching point, the switching control point and a second service switching point according to the invention. The second hub SSP receives the customized dialing plan (CDP) abbreviated dial code and triggers on the code at step 180. The second hub SSP then sends an information analyzed query to the SCP at step 182. The query includes the abbreviated dial code. The SCP determines if the call is in-network at step 184. When the call is not in-network an error has occurred in the service at step 186. When the call is in-network, the SCP then sends an analyzed route message containing a routing instruction at step 188. The hub SSP then routes the call to a second SSP at step 190 based on the routing instruction. The second hub SSP also sends an IAM to the second SSP (second service switching point) at step 192 containing a translated routing number. The translated routing number is the directory number associated with the abbreviated dialing code. The second SSP then routes the call to the called part at step 194, which ends call processing at step 196.

Using the process described above a customer can seamlessly connect a plurality of virtual networks. The process does not require any capital equipment cost or any equipment maintenance problems. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of connecting a plurality of virtual networks, comprising the steps of:
   (a) receiving a plurality of digits at a first service switching point in a first local access and transport area;
   (b) sending a query from the first service switching point to a switching control point;
   (c) when the plurality of digits result in a call that is an interLATA call, sending a response from the switching control point to the first service switching point that contains a routing instruction to a first hub service switching point;
   (d) routing the interLATA call from the first service switching point to the first hub service switching point;
   (e) transmitting an initial address message to the first hub service switching point;
   (f) sending a second query to the switching control point from the first hub service switching point;
   (g) receiving a second response from the switching control point; and
   (h) routing the interLATA call over a tie line to a second hub service switching point in a second local access and transport area.

2. The method of claim 1, further including the steps of:
   (i) sending a third query to the switching control point from the second hub service switching point;
   (j) receiving a third response from the switching control point;
   (k) routing the call to a second terminating service switching point.

3. The method of claim 2, further including the step of:
   (l) routing the call from the second service switching point to a called party.

4. The method of claim 2, wherein step (i) further includes the steps of:
   (i1) transmitting an abbreviated dialing code to the switching control point;
   (i2) converting the abbreviated dialing code to a directory number.

5. The method of claim 2, wherein step (j) further includes the step of receiving a directory number.

6. The method of claim 1, wherein step (a) further includes the steps of:
   (a1) receiving an off-hook signal at the first service switching point;
   (a2) transmitting a dial tone from the first service switching point.

7. The method of claim 1, wherein step (b) further includes the step of sending the plurality of digits in the query.

8. The method of claim 1, wherein step (e) further includes the step of transmitting the plurality of digits less an access code as part of the initial address message.

9. The method of claim 1, wherein step (e) further includes the step of transmitting a translated routing number as part of the initial address message.

10. The method of claim 1, wherein step (g) further includes the step of receiving a primary trunk group as part of the second response.

11. The method of claim 1, wherein step (h) further includes the step of selecting the tie line based on a primary trunk group.

12. The method of claim 1, wherein step (h) further includes the step of transmitting the plurality of digits less an access code over the tie line to the second hub service switching point.

13. The method of claim 1, wherein step (h) further includes the step of transmitting an abbreviated dialing code over the tie line to the second hub service switching point.

14. A method of connecting a plurality of virtual networks, comprising the steps of:
   (a) receiving a plurality of dialed digits at a first service switching point in a first local access and transport area;
   (b) when the first service switching point is determined to be a hub service switching point, sending a query from the first service switching point to a service control point;
   (c) determining if the plurality of dialed digits require an access to private networks interLATA call; and
   (d) when the access to private networks interLATA call is required, routing a call over a tie line to a second hub service switching point in a second local access and transport area.

15. The method of claim 14, further including the steps of:
   (e) when a called party is not directly connected to the second hub service switching point, transmitting a query from the second hub service switching point to a switching control point;
   (f) receiving a response from the switching control point;
   (g) routing the call to a second service switching point.

16. The method of claim 14, further including the step of:
   (e) when a called party is directly connected to the second hub service switching point, routing the call to the called party.

17. The method of claim 14, further including the steps of:
   (e) when the first service switching point is not the hub service switching point, sending a first query to the switching control point;
   (f) receiving a first response from the switching control point;
   (g) routing the call to the hub service switching point.

18. The method of claim 17, further including the steps of:
   (h) sending a second query from the hub service switching point to the switching control point;
   (i) receiving a second response including a primary trunk group from the switching control point;
   (j) routing the call over the tie line to the second hub service switching point in the second local access and transport area.

19. A method of connecting a plurality of virtual networks, comprising the steps of:
   (a) selecting the plurality of virtual networks to connect;
   (b) receiving a network access request at a service switching point in a first of the plurality of virtual networks;
   (c) determining if the network access request is an interLATA request;
   (d) when the network access request is the interLATA request, routing a network connection to a hub service switching point;

(e) determining if the network access request is to a second of the plurality of virtual networks; and (f) when the network address request is to the second of the plurality of virtual networks, sending a routing instruction to the hub service switching point.

20. The method of claim 19, further including the step of:

(g) routing the network connection to a second hub service switching point in the second of the plurality of virtual networks.

21. The method of claim 20, further including the steps of:

(h) receiving a second routing instruction at the second hub service switching point;

(i) routing the network connection to a second terminating service switching point.

22. The method of claim 21, further including the step of:

(j) routing the network connection to a terminal point.

23. The method of claim 19, wherein step (a) further includes the step of selecting a plurality of tie lines to connect a plurality of hub service switching points in the plurality of virtual networks.

24. The method of claim 23, further including the step of determining a primary trunk group for each of the plurality of tie lines.

* * * * *